United States Patent [19]

Kurokawa

[11] Patent Number: 4,607,289
[45] Date of Patent: Aug. 19, 1986

[54] FACSIMILE TRANSCEIVER CAPABLE OF STORING AND RELAYING DATA

[75] Inventor: Shunji Kurokawa, Ebina, Japan

[73] Assignee: Ricoh Company, Ltd., Tokyo, Japan

[21] Appl. No.: 467,403

[22] Filed: Feb. 16, 1983

[30] Foreign Application Priority Data

Feb. 26, 1982 [JP] Japan .................. 57-30297

[51] Int. Cl.$^4$ ............................................. H04N 1/32
[52] U.S. Cl. ................................... 358/257; 358/280; 358/286; 340/825.18; 340/825.52
[58] Field of Search ............... 358/256, 257, 280, 286, 358/258; 340/825.18, 825.52

[56] References Cited

U.S. PATENT DOCUMENTS

| | | | |
|---|---|---|---|
| 3,866,175 | 2/1975 | Seifert, Jr. et al. | 340/825.52 |
| 3,914,539 | 10/1975 | Hashimoto | 358/257 |
| 4,058,672 | 11/1977 | Crager et al. | 358/257 |
| 4,114,139 | 9/1978 | Boyd et al. | 340/825.31 |
| 4,249,216 | 2/1981 | Kamda | 358/257 |

Primary Examiner—James J. Groody
Assistant Examiner—Edward L. Coles
Attorney, Agent, or Firm—David G. Alexander

[57] ABSTRACT

A facsimile transceiver having a data storing and relaying function in which facsimile data transmitted thereto from a remote facsimile station is stored for a moment and then transmitted to a second remote facsimile station which is designated by the first remote station. The transceiver accepts a data relay request from the first remote station only when registered identification data which accepts a request for relaying data coincides with identification data which is included in a control signal transmitted to the intermediate transceiver from the first remote station.

4 Claims, 1 Drawing Figure

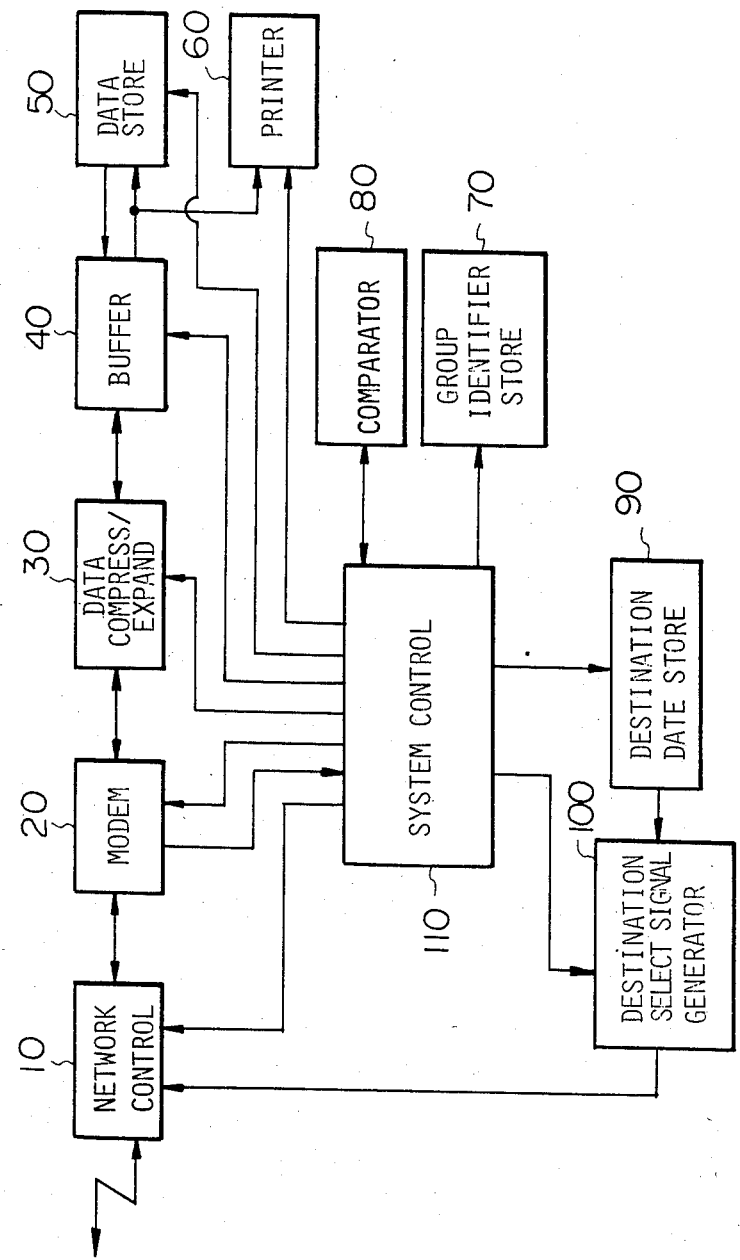

FACSIMILE TRANSCEIVER CAPABLE OF STORING AND RELAYING DATA

BACKGROUND OF THE INVENTION

The present invention relates to a facsimile communication system and, more particularly, to a facsimile transceiver which is capable of serving to store and relay data on demand as well as communicating data in an ordinary manner.

Some modern facsimile transceivers are furnished with an on-demand type function of temporarily storing data communicated thereto from a remote facsimile station and relaying the data to another remote facsimile station which is designated by the first station.

The current situation in the art of facsimile transceivers of the type described is that the relaying or intermediate transceiver unconditionally relays data on demand regardless of a station which has requested the intermediate station to relay data (referred to as addresser's station hereinafter) or a station which is to receive the relayed data from the intermediate station (referred to as addressee's station hereinafter). This, however, may lead to offensive use of such transceivers. If, for example, company X in city A transmits desired data to company Y in city B having the data relayed by company Z in the same city A without permission of the company Z, the company Z would be incidiously charged for the long distance call between the cities A and B while the company X would be charged only for the short distance call within the same city. Moreover, when the addresser's station specifies a time for the delivery of the data from the intermediate station to the addressee or when the addressee is busy, the intermediate station or company Z is obliged to hold the data without any reason for the resulting prolonged period of time. This, due to the limited capacity of a storage, would affect the relaying service among a set of transceivers in a group to which the transceiver at the company Z belongs, as well as other services which share the same storage.

SUMMARY OF THE INVENTION

It is therefore an object of the present invention to provide a facsimile transceiver capable of storing and relaying data which does not allow nonpermitted or free use thereof by another for relaying purpose by accepting data relay requests only from registered remote facsimile stations.

It is another object of the present invention to provide a generally improved facsimile transceiver capable of storing and relaying data.

A facsimile transceiver embodying the present invetion has an on-demand type function of temporarily storing facsimile data transmitted thereto from one remote facsimile station and realying the stored data to another remote facsimile station which is designated by the one station. The transceiver includes a system control means for controlling the entire transceiver, a data storage means for storing the received facsimile data, and a first storage means for registering therein identification data which accepts a request for relaying facsimile data. A comparator means compares with the identification data registered in the first storage means, identification data included in a control signal which is transmitted to the transceiver before the facsimile data from the one remote station. The identification data in the control signal is recognized by the system control means. A second storage means stores destination data which represents the another remote station and is included in the control signal and recognized by the system control means. A destination select signal generator means generates a destination select signal to call the another remote station in response to the destination data which is read out of the second storage means.

Preferably, the control signal includes therein the destination data, data indicative of the one remote station and data indicative of a specified relaying time.

Desirably, each of the registered identification data and the identification data included in the control signal comprises at least one of the destination data and data indicative of the one station.

Conveniently, each of the registered identification data and the identification data included in the control signal comprises identification data which identifies a specific group to which the transceiver belongs.

Other objects and features, together with the foregoing are attained in the embodiment described in the following description and illustrated in the accompanying drawing.

BRIEF DESCRIPTION OF THE DRAWING

Single FIGURE is a block diagram of a facsimile transceiver embodying the present invention which is capable of storing and relaying facsimile data.

DESCRIPTION OF THE PREFERRED EMBODIMENT

While the facsimile transceiver capable of storing and relaying data of the present invention is susceptible of numerous physical embodiments, depending upon the environment and requirements of use, a substatial number of the herein shown and described embodiment have been made, tested and used, and all have performed in an eminently satisfactory manner.

Referring to FIGURE, the facsimile transceiver includes a network control unit 10 adapted to control the connection of the transceiver to a telephone line. The network control unit 10 connects to a MODEM 20 which processes data to be transmitted or received. The MODEM 20 connects to a data compression/expansion section 30 for compressing data to be transmitted or expanding received data. This section 30 connects to a data buffer 40 which in turn connects to a data storage 50 which has a capacity large enough to accommodate a plurality of pages of image data. A print section 60 prints out data on a sheet of paper to produce a hard copy. A storage 70 has stored therein specific registered data which identifies a group to which the transceiver belongs, i.e. group identifier. A comparator 80 compares a group identifier included in an incoming control signal from a remote addresser's station which requests the transceiver to relay data, with the group identifier stored in the storage 70. Upon coincidence of the two group identifiers, a second storage 90 stores data concerned with one or more addressees or destination data which may be included in the control signal. A destination select signal generator 100 supplies the network control 10 with a dial pulse signal in response to destination data which is read out of the storage 90. The operations of the structural elements described so far are totally controlled by a system control unit 110.

The facsimile transceiver having the above construction will be operated as follows.

In a facsimile communication system of the kind concerned, transmission of image data is usually preceded by that of a control signal which designates an addressee's station to which data should be relayed, an addresser's station which sends a relay request to the intermediate station, a desired relaying time, etc. In accordance with the present invention, the control signal is elaborated to additionally include a group identifier which is registered by adequate means in advance. The control signal is transmitted from an addresser's station to the intermediate station. At the intermediate station, the system control 110 recognizes the group identifier out of the control signal and the comparator 80 compares it with the registered group identifier stored in the storage 70. If the received group identifier is noncoincident with the stored group identifier, or if the system control 110 does not recognize any group identifier, the system control 110 stops controlling the various sections of the transceiver so as to prevent the transceiver from receiving image data from the addresser's station. If the two group identifiers are coincident with each other, the system control 110 responds to an output of the comparator 80 by accepting the data relay request from the addresser's station and identifying destination data included in the control signal. The destination signal is fed to and stored in the storage 90. The system control 110 then sends a receive ready signal back to the addresser's station.

Desired image data which the addresser's station transmits in response to the receive ready signal comes in the intermediate station through the network control 10. The image data is demodulated by the MODEM 20, expanded by the data expander 30 and then fed to the storage 50. After receiving all the desired data, the system control 110 reads the destination data out of the storage 90 to supply it to the destination select signal generator 100, at a time which the addresser's station may specify. The select signal generator 100 generates a dial pulse signal which matches with the input destination data. The dial pulse signal is transmitted to the addressee's station via the network control 10 thereby calling the addressee. The system control 110, after confirming a response from the addressee's station, reads image data out of the storage 50, compresses the image data at the data compressor 30, modulates the compressed data at the MODEM 20, and then transmits it to the addressee's station via the network control 10.

As described above, the facsimile system of the present invention accepts a data relay request for relaying to a designated remote station only when a control signal fed from a remote requesting station includes a registered group identifier.

In summary, it will be seen that the present invetion provides a facsimile transceiver in which a simple means suffices to eliminate nonpermitted or free use thereof by another remote station for data relaying purpose and thereby facilitates efficient relaying services by the transceiver.

Various modifications will become possible for those skilled in the art after receiving the teachings of the present disclosure without departing from the scope thereof. For example, while a special group identifier has been employed in the embodiment shown and described in order to determine whether a data relay request from a remote station is equitable, addressee data or addresser data may be utilized for the same purpose such that the data is compared with addressee data or addresser data registered in the intermediate station in advance. This is attainable by substituting an addressee data or addresser data storage for the identification data storage 70 and causing it to store in advance data which represents one or more addressees or addressers. Then, the comparator 80 will compare addressee data or addresser data recognized by the system control 110 out of the control signal with the content stored in the storage, the system control 110 accepting the request upon coincidence of the two kinds of data. Again, this type of facsimile transceiver will be effectively safeguarded against nonpermitted use because addressees or addressers are limited. If desired, both the addressee data and addresser data may be used for determining whether or not to accept a request for data relaying.

What is claimed is:

1. A facsimile transceiver having an on-demand type function of temporarily storing facsimile data transmitted thereto from one remote facismile station and relaying the stored data to another remote facsimile station which is designated by said one station comprising:
   a system control means for controlling the entire transceiver;
   a data storage means for storing the received facsimile data;
   a first storage means for registering therein identification data which accepts a request for relaying facsimile data;
   a comparator means for comparing with the identification data registered in the first storage means, identification data included in a control signal which is transmitted to the transceiver before the facsimile data from said one remote station, said identification data in the control signal being recognized by the system control means;
   a second storage means for storing destination data which represents said another remote station and is included in the control signal and recognized by the system control means; and
   a destination select signal generator means for generating a destination select signal to call said another remote station in response to the destination data which is read out of the second storage means;
   the system control means causing the facsimile data to be relayed to said another station only if the identification data included in the control signal corresponds to the identification data registered in the first storage means.

2. A system as claimed in claim 1, in which the control signal includes therein the destinatin data, data representing said one remote statin and data indicative of a specified relaying time.

3. A system as claimed in claim 2, in which each of the registered identification data and the identification data included in the control signal comprises at least one of the destination data and data indicative of said one station.

4. A system as claimed in claim 1, in which each of the resistered identification data and the identification data included in the control signal comprises indentification data which identifies a specific group to which the transceiver belongs.

* * * * *